United States Patent
Chen et al.

(10) Patent No.: US 7,440,271 B2
(45) Date of Patent: Oct. 21, 2008

(54) MOUNTING APPARATUS FOR SECURING DATA STORAGE DEVICE

(75) Inventors: Yun-Lung Chen, Taipei Hsien (TW); Yu-Ming Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/672,962

(22) Filed: Feb. 9, 2007

(65) Prior Publication Data
US 2008/0123280 A1  May 29, 2008

(30) Foreign Application Priority Data
Nov. 29, 2006  (CN) .................... 2006 2 0016067.5

(51) Int. Cl.
*G06F 1/16* (2006.01)
(52) U.S. Cl. ................ 361/685; 211/193; 360/96.4; 248/539
(58) Field of Classification Search ............... 206/320, 206/531, 535; 360/90, 92, 92.1, 96.4, 96.61; 248/539, 675; 312/215, 313; 439/567; 211/90.02, 211/90.01, 193; 361/679–687, 724–727
See application file for complete search history.

(56) References Cited

U.S. PATENT DOCUMENTS

| 6,377,449 | B1 | 4/2002 | Liao et al. | |
|---|---|---|---|---|
| 2007/0145866 | A1* | 6/2007 | Huang et al. | 312/215 |
| 2007/0205349 | A1* | 9/2007 | Fan et al. | 248/539 |
| 2007/0235625 | A1* | 10/2007 | Liang et al. | 248/675 |

* cited by examiner

*Primary Examiner*—Hung V Duong
(74) *Attorney, Agent, or Firm*—Wei Te Chung

(57) ABSTRACT

A mounting apparatus is provided for securing a data storage device. The data storage device has two opposite side walls. Each side wall forms a pair of posts. The mounting apparatus includes a chassis, a bracket mounted in the chassis for accommodating the data storage device, and a latch member pivotally mounted to the bracket. A plurality of slots is defined in one side wall of the bracket for receiving the posts of the data storage device. The latch member includes a base. An elastic arm and a hook extend from the base. The elastic arm resists against the chassis to urge the hook partially covering one of the mounting slots for preventing a corresponding post received in the mounting slot disengaging therefrom. The latch member is being pressable to depress the elastic arm and remove the hook away from the mounting slot thereby release the corresponding post.

20 Claims, 5 Drawing Sheets

MOUNTING APPARATUS FOR SECURING DATA STORAGE DEVICE

BACKGROUND OF THE INVENTION

1. Field of the Invention

The present invention relates to a mounting apparatus, particularly to a mounting apparatus for securing data storage devices, such as hard disk drives, floppy disk drives, compact disk read-only memory (CD-ROM) drives, etc.

2. Description of Related Art

Usually, a data storage device is simply screwed to a computer enclosure. This conventional mounting means substantially wastes time, and thus adds to the complexity and difficulty of assembling the data storage device to the computer enclosure and later disassembling therefrom.

Another means of mounting a data storage device uses a bracket, a pair of slide members attached to the data storage device, and a pair of levers pivotably secured to the bracket. The bracket defines a pair of through openings therein. The slide members are disposed on the data storage device. Each slide member has a resilient engagement portion, for engaging in the through openings of the bracket respectively. Each of the levers has a projecting portion for urging the corresponding engagement portion of the slide member to resiliently deform. In assembly, the data storage device together with the slide members is inserted into the bracket. When the engagement portions of the slide members are received in the through openings of the bracket, the data storage device is secured in the bracket. At this time, the projecting portions of the levers abut against the engagement portions of the slide members respectively. In removing the data storage device, the levers are pivoted to have the projecting portions resiliently deform the engagement portions of the slide members respectively, thereby disengaging the engagement portions from the corresponding through openings of the bracket. Thus, the data storage device can be removed from the bracket. However, due to the number of elements needed and the complexity of the structure, the mounting apparatus described above is expensive to manufacture.

What is needed, therefore, is a mounting apparatus conveniently securing a storage device to a bracket of a computer enclosure and having a simple structure.

SUMMARY OF THE INVENTION

A mounting apparatus is provided for securing a data storage device. The data storage device has two opposite side walls. Each sidewall forms a pair of posts. The mounting apparatus includes a chassis, a bracket mounted in the chassis for accommodating the data storage device, and a latch member pivotally mounted to the bracket. A plurality of slots is defined in one side wall of the bracket for receiving the posts of the data storage device. The latch member includes a base. An elastic arm and a hook respectively extend from the base. The elastic arm resists against the chassis to urge the hook partially covering one of the mounting slots for preventing a corresponding post received in the mounting slot disengaging therefrom. The latch member is being pressable to depress the elastic arm and remove the hook away from the mounting slot thereby release the corresponding post.

Other advantages and novel features of the present invention will become more apparent from the following detailed description of preferred embodiment when taken in conjunction with the accompanying drawings, in which:

DETAILED DESCRIPTION OF THE INVENTION

Figure 1:
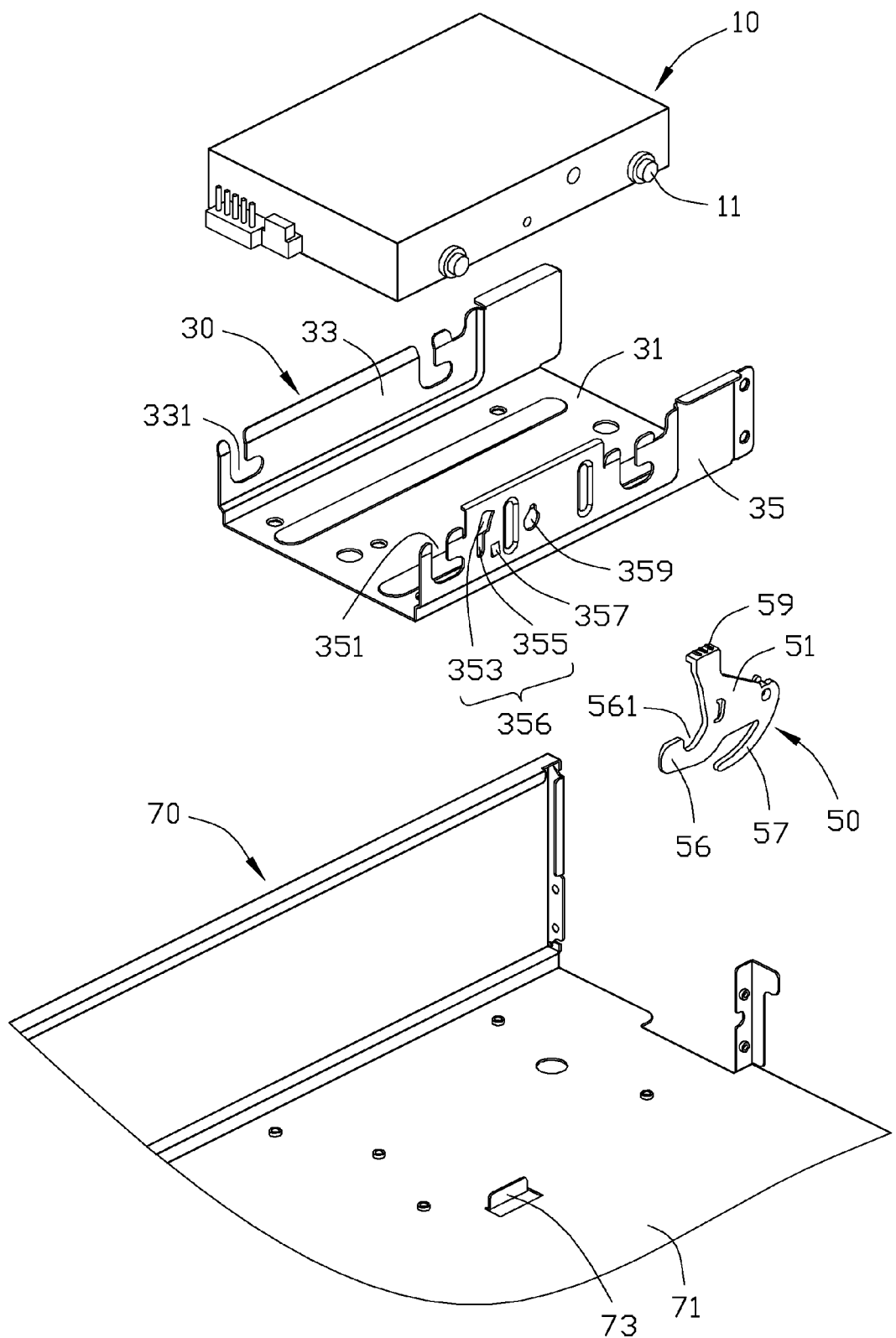
FIG. 1 is an exploded, isometric view of a mounting apparatus of a preferred embodiment, together with a data storage device, the mounting apparatus including a chassis, a bracket, and a latch member.

Referring to FIG. 1, a mounting apparatus used for securing a data storage device 10 includes a bracket 30 for accommodating the data storage device 10, a latch member 50 pivotably attached to the bracket 30 for securing the data storage device 10 in the bracket 30, and a chassis 70. The data storage device 10 may, for example, be a hard disk drive, a floppy disk drive, a compact disk read-only memory (CD-ROM) drive, etc. The data storage device 10 includes a pair of side walls, and each side wall has a pair of posts 11.

The bracket 30 includes a bottom wall 31, and a pair of opposite side walls 33, 35 perpendicular to the bottom wall 31. Each side wall 33, 35 defines a pair of mounting slots 331, 351 for respectively accommodating the posts 11 of the data storage device 10. The mounting slots 331, 351 are L-shaped, and each mounting slot has a horizontal end and a vertical end extending to a top edge of the corresponding side wall. The side wall 35 defines an arched guiding slot 356 adjacent to one of the mounting slots 351. The guiding slot 356 includes a wide portion 353 connected to a narrow portion 355. An elastic stop member 357 protrudes from an outside of the side wall 35 adjacent to the guiding slot 356. A calabash-shaped pivotal hole 359 is defined between the pair of mounting slots 351.

Figure 2:
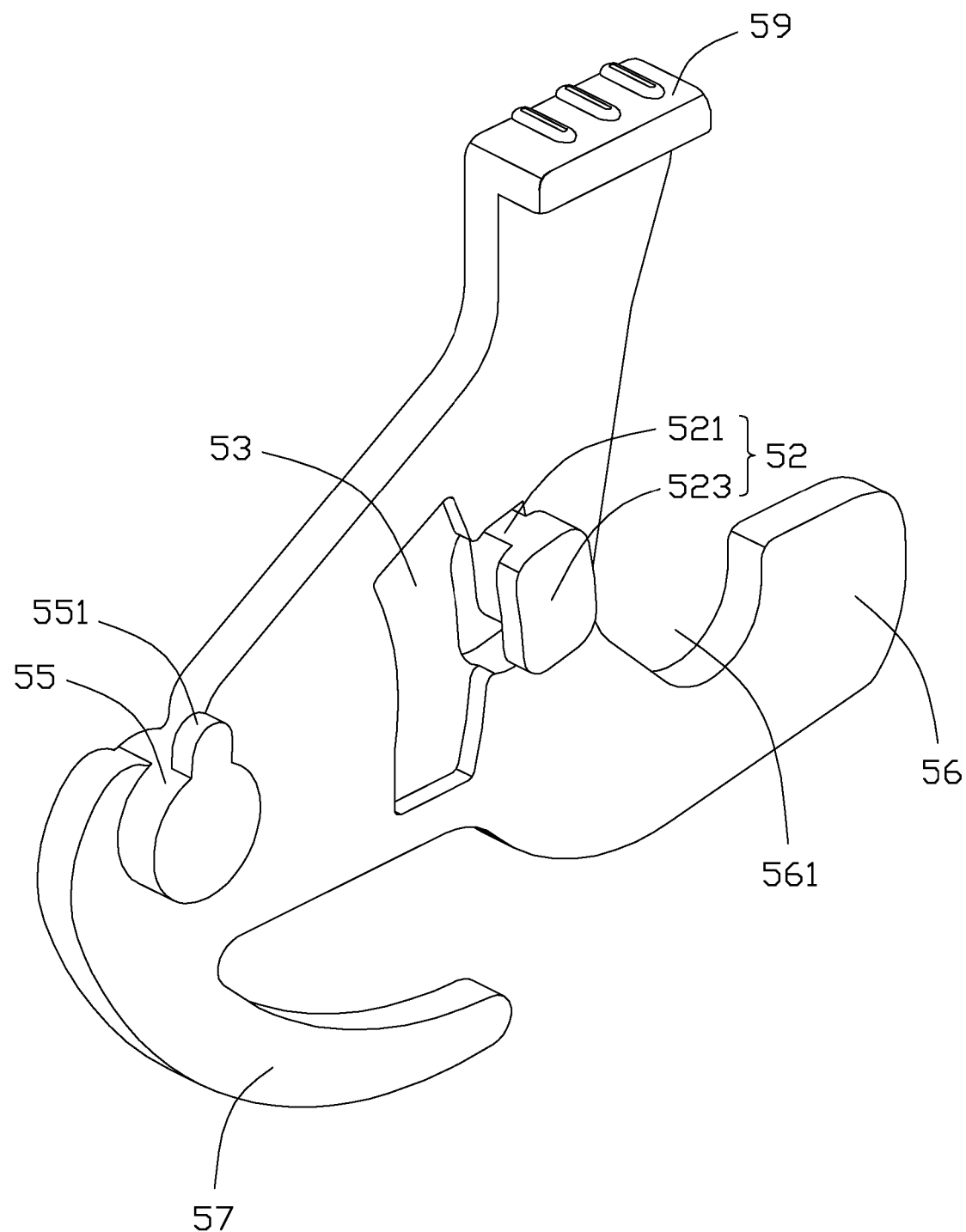
FIG. 2 is an enlarged, isometric view of the latch member of FIG. 1, but viewed from another aspect.

Referring also to FIG. 2, the latch member 50 includes a substantially triangular base 51. A sliding block 52 corresponding to the guiding slot 356 protrudes inward from the base 51. The sliding block 52 includes a narrow sliding portion 521 extending from the base 51 for sliding in the narrow portion 355 of the guiding slot 356, and a wide securing portion 523 laterally extending from a free end of the narrow sliding portion 521 of the sliding block 52. The securing portion 523 of the sliding block 52 is a little smaller than the wide portion 353 of the guiding slot 356 in the bracket 30 such that the securing portion 523 is extendable through the wide portion 353 of the guiding slot 356. When the narrow sliding portion 521 slides in the narrow portion 355 of the guiding slot 356, the securing portion 523 engages to the side wall 35 of the bracket 30. A recess 53 corresponding to the elastic stop member 357 of the bracket 30 is defined in the base 51 adjacent to the sliding block 52. A calabash-shaped pivot member 55 corresponding to the pivot hole 359 of the bracket 30 protrudes from a first corner of the triangular base 51. The pivot member 55 includes a securing head 551 which is thinner than the other portion of the pivot member 55 such that the securing head 551 is extendable through the pivot hole 359 to slidably engage with the inner surface of the side wall 35 of the bracket 30 when the pivot member 55 rotates in the pivot hole 359. A hook 56 extends from a second corner of the triangular base 51. A receiving space 561 is defined between the hook 56 and the base 51. An arched elastic arm 57 extends from the first corner of the base 51 adjacent to the pivot member 55 toward the hook 56. A handle 59 protrudes up from a third corner of the base 51.

The chassis 70 includes a bottom wall 71. A limiting tab 73 extends up from the bottom wall 71 corresponding to the elastic arm 57 of the latch member 50.

Figure 3:
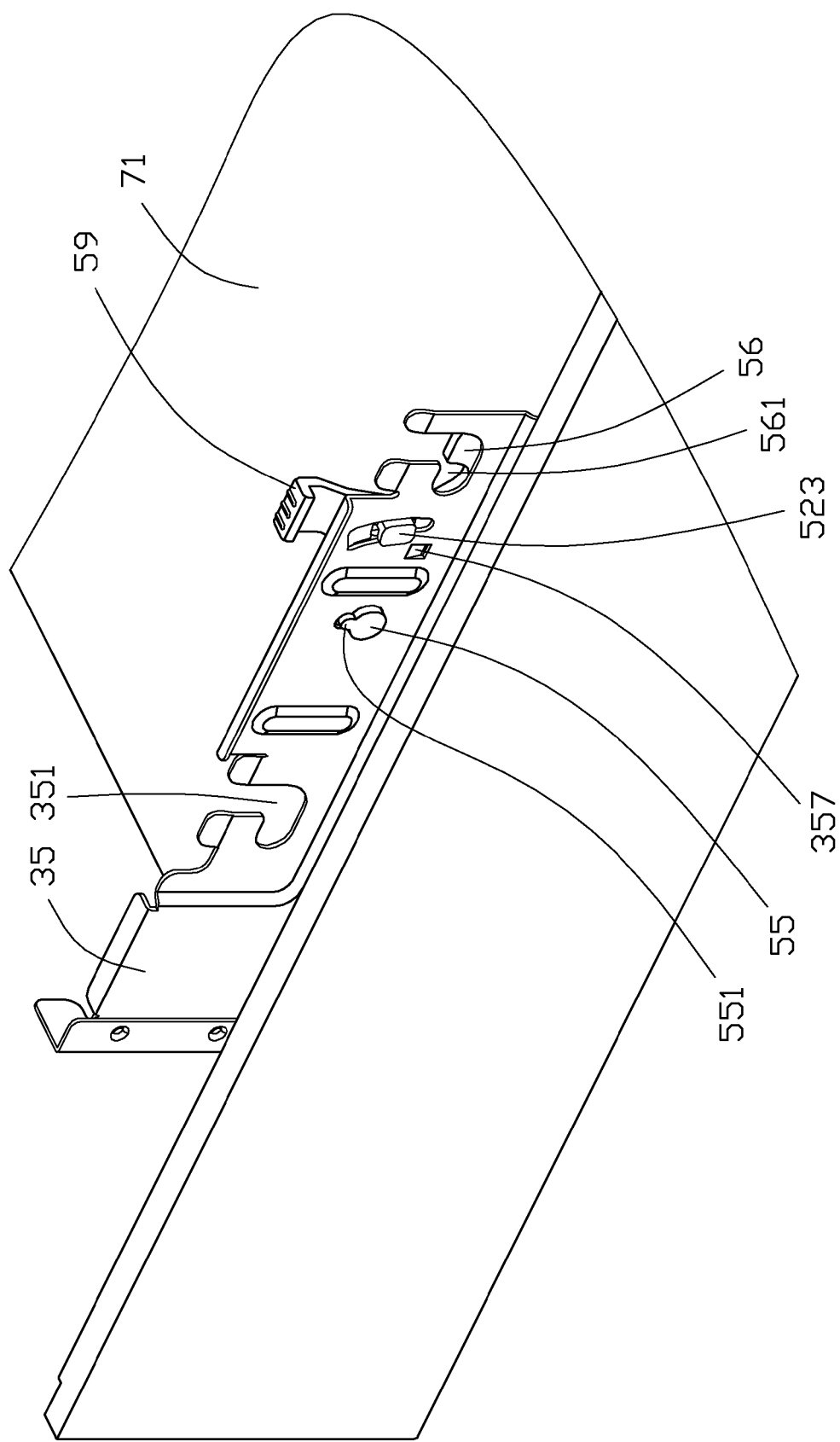
FIG. 3 is an assembled view of the mounting apparatus of FIG. 1, but viewed from another aspect.

Referring also to FIG. 3, in assembly, the bracket 30 is mounted in the chassis 70 in a manner known by persons in the art. The elastic arm 57 of the latch member 50 is disposed on the bottom wall 71 of the chassis and sandwiched between the limiting tab 73 and the side wall 35 of the bracket 30. The pivot member 55 and the sliding block 52 of the latch member 50 are respectively aligned with the pivot hole 359 and the guiding slot 356 and engaged therein. The handle 59 is pressed to drive the latch member 50 to rotate down and depress the elastic arm 57. The latch member 50 slides down with the base 51 thereof depressing the elastic stop member 357 until a bottom edge of the recess 53 engages with the bottom end of the elastic stop member 357, thereby preventing the latch member 50 from rotating back. At this point, the latch member 50 is retained by the elastic stop member 357, and the elastic arm 57 is in an initial state. The securing portion 523 of the sliding block 52 and the securing head 551 of the pivot member 55 are respectively rotated down and engage with the side wall 35 of the bracket 30, thereby preventing the slide block 52 and the pivot member 55 disengaging from the guiding slot 356 and the pivot hole 359 of the bracket 30 respectively. The horizontal end of one mounting slot 351 in the side wall 35 is partially blocked by the hook 56 of the latch member 50.

Figure 4:
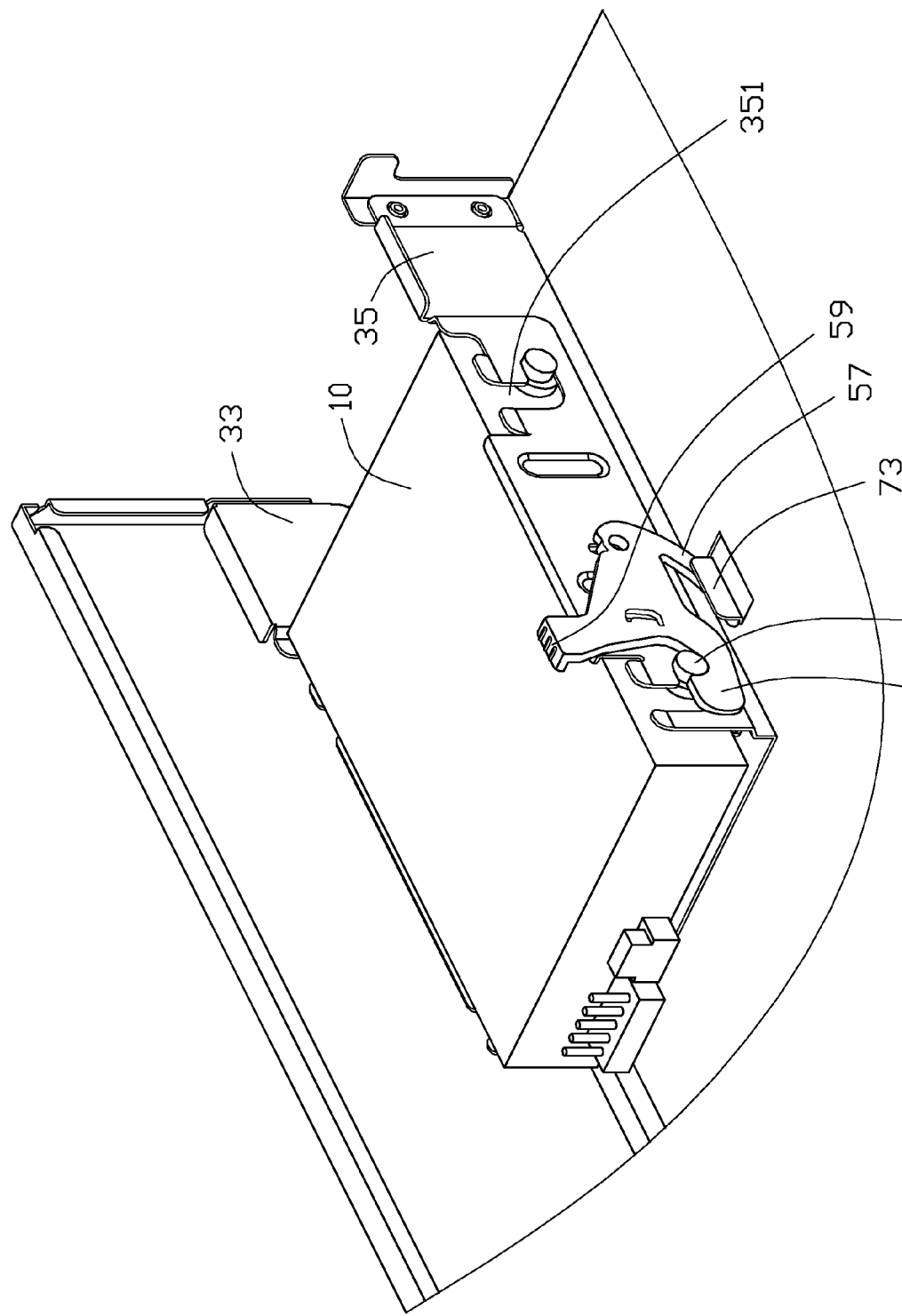
FIG. 4 is an assembled view of FIG. 1.
Figure 5:
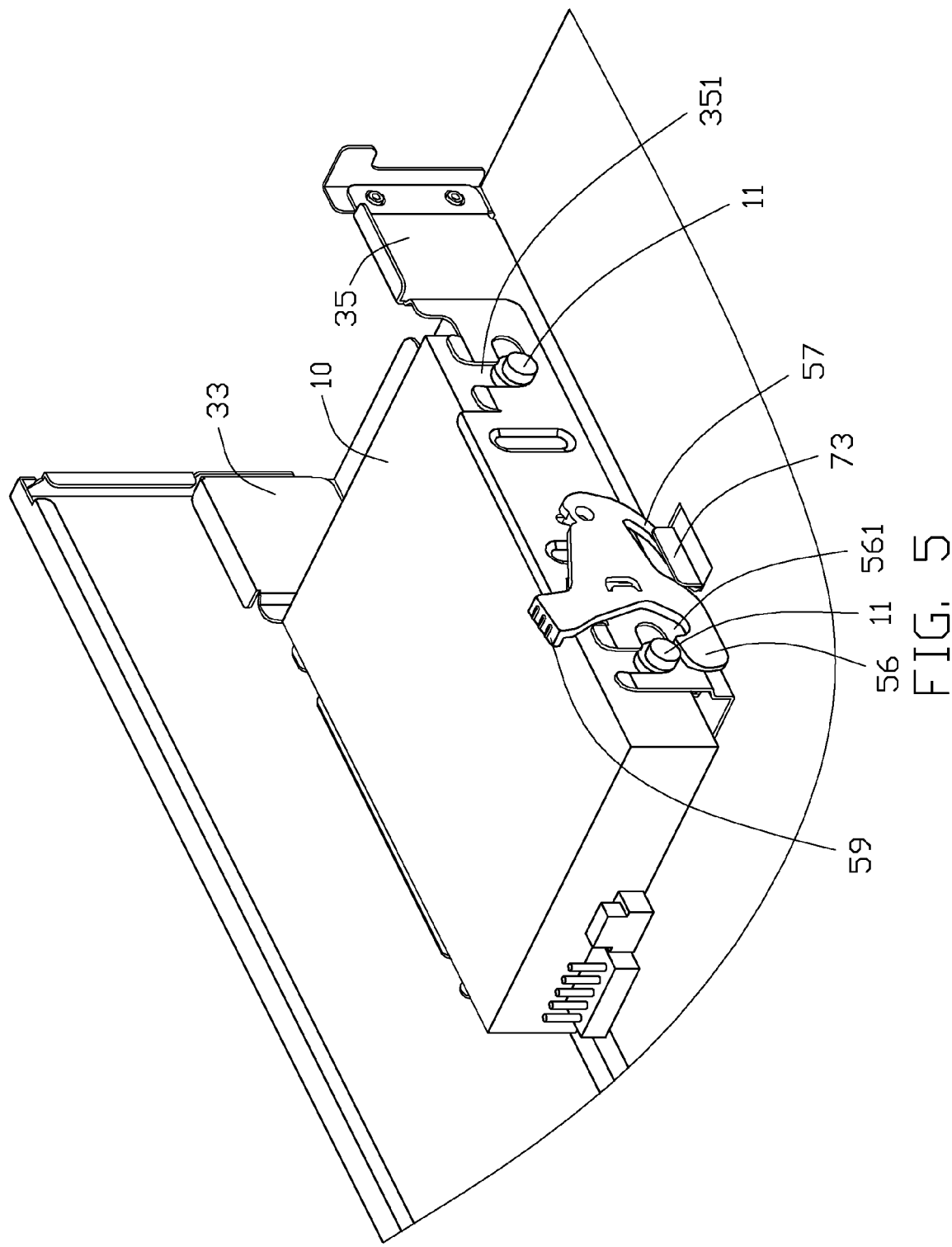
FIG. 5 is an assembled view of FIG. 1 when the data storage device is pulled out from the bracket.

Referring also to FIGS. 4 and 5, in use, the handle 59 is pressed to drive the latch member 50 to rotate down about the pivot member 55. The elastic arm 57 is further pressed, and the hook 56 of the latch member 50 moves down to entirely expose the horizontal end of the mounting slot 351. The latch member 50 is then in a second state. The posts 11 of the data storage device 10 are respectively aligned with the vertical ends of the mounting slots 351 and slide therein. Then, the data storage device 10 is pushed along the horizontal end of the mounting slot 351 until the posts 11 abut inner portions of the horizontal end of the mounting slot 351. The handle 59 of the latch member 50 is then released and the elastic arm 57 rebounds to the initial state. The hook 56 of the latch member 50 moves back to partially block the horizontal end of the mounting slot 351. One of the posts 11 is accommodated in the receiving space 561 and retained in the mounting slot 351 of the bracket 30 by the hook 56. Thus, the data storage device 10 is secured to the bracket 30.

In disassembly, the handle 59 of the latch member 50 is pressed down to drive the hook 56 of the latch member 50 to move under a bottom edge of the horizontal end of the mounting slot 351. Then, the data storage device 10 is pulled out from the mounting slot 351 and removed from the bracket 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for securing a data storage device having two opposite side walls each of which providing a pair of posts, comprising:

a chassis;
   a bracket mounted in the chassis and configured for accommodating the data storage device, the bracket comprising a pair of side walls each defining therein a mounting slot for receiving a corresponding post of the data storage device; and
   a latch member pivotally mounted to the bracket, the latch member comprising a base, an elastic arm and a hook extending from the base, the elastic arm resisting against the chassis to cause the hook covering one portion of one of the mounting slots, for preventing the corresponding post received in the mounting slot disengaging therefrom.

2. The mounting apparatus for securing a data storage device as described in claim 1, wherein a sliding block protrudes from the base of the latch member, an arched guiding slot is defined in one of the side walls of the bracket along a movement path of the sliding block for guiding movement of the sliding block when the latch member is pivoted.

3. The mounting apparatus for securing a data storage device as described in claim 2, wherein the guiding slot comprises a wide portion and a narrow portion, the sliding block comprises a narrow sliding portion for sliding in the narrow portion of the guiding slot, and a wide securing portion laterally extending from a free end of the narrow portion of the sliding block and being extendable through the wide portion of the guiding slot to slidably engage with the inner surface of said one of the side walls when the narrow sliding portion slides in the narrow portion of the guiding slot.

4. The mounting apparatus for securing a data storage device as described in claim 1, wherein a recess is defined in a surface of the base facing the bracket, an elastic stop member protrudes from one of the side walls of the bracket with a bottom end thereof abutting against a bottom edge of the recess, for preventing the latch member rotating up to thereby keep the elastic arm resisting against the chassis.

5. The mounting apparatus for securing a data storage device as described in claim 1, wherein a pivot hole is defined in one of the side walls of the bracket, and a pivot member is disposed on the base of the latch member for pivotably engaging in the pivot hole.

6. The mounting apparatus for securing a data storage device as described in claim 5, wherein the pivot hole and the pivot member are both calabash-shaped, and the pivot member comprises a securing head extending through the pivot hole to slidably engaging with the inner surface of said one of the side walls.

7. The mounting apparatus for securing a data storage device as described in claim 5, wherein the base of the latch member is substantially triangular, the pivot member is formed at a first corner of the base, the hook extends from a second corner of the base, a receiving portion is defined between the hook and the base and communicates with one corresponding mounting slot defined in said one of the side walls.

8. The mounting apparatus for securing a data storage device as described in claim 7, wherein the elastic arm is arched and extends toward the hook from the first corner of the base adjacent to the pivot member.

9. The mounting apparatus for securing a data storage device as described in claim 7, wherein a handle protrudes from a third corner of the base of the latch member.

10. The mounting apparatus for securing a data storage device as described in claim 1, wherein the chassis comprises a bottom wall with a limiting tab protruding therefrom, and the elastic arm of the latch member is sandwiched between the limiting tab and one of the side walls of the bracket.

11. A computer enclosure, comprising:
a chassis;
a data storage device having two sidewalls, each sidewall providing a pair of posts;
a bracket mounted on the chassis for accommodating the data storage device, the bracket comprising a pair of side walls each defining a pair of mounting slots for receiving the corresponding posts of the data storage device, a pivot hole defined in one of the side walls between the pair of mounting slots; and
a latch member comprising a base, an elastic arm which resists against the chassis, and a hook extending from the base, a pivot member protruding from the base to be pivotably received in the pivot hole of the bracket, the latch member being rotatable between an initial state where the hook covers one portion of one of the mounting slots for blocking a corresponding post of the data storage device therein and a second state where the elastic arm is depressed and the hook sinks down to entirely expose the mounting slot for releasing the post therefrom.

12. The computer enclosure as described in claim 11, wherein a sliding block protrudes from the base of the latch member, an arched guiding slot is defined in the side wall of the bracket along a path of the sliding block when the latch member is pivoted.

13. The computer enclosure as described in claim 11, wherein a recess is defined in the base of the latch member, an elastic stop member protrudes from the side wall of the bracket with a bottom end thereof abutting on a bottom edge of the recess, for preventing the latch member rotating up.

14. The computer enclosure as described in claim 11, wherein the pivot hole and the pivot member are both calabash-shaped, the pivot member comprises a securing head secured to the side wall of the bracket.

15. The computer enclosure as described in claim 11, wherein the base of the latch member is substantially triangular, the pivot member is formed at a first corner of the base, the hook extends from a second corner of the base, a receiving portion is defined between the hook and the base.

16. The computer enclosure as described in claim 15, wherein the elastic arm is arched and extends toward the hook from the first corner of the base adjacent to the pivot member.

17. The computer enclosure as described in claim 15, wherein a handle protrudes from a third corner of the base of the latch member.

18. The computer enclosure as described in claim 11, wherein the chassis comprises a bottom wall with a limiting tab protruding therefrom, and the elastic arm of the latch member is sandwiched between the limiting tab and the side wall of the bracket.

19. A computer enclosure comprising:
a chassis;
a bracket mounted in the chassis, the bracket comprising a bottom wall fixed to the chassis and a pair of side walls extending from the bottom wall, each of the side walls defining a mounting slot, a pivot hole being defined in one of the side walls;
a data storage device mounted in the bracket and having a pair of sidewalls each providing a post extending outwardly through a corresponding mounting slot; and
a latch member for releasbly latching the data storage device to the bracket, the latch member comprising a base pivotably attached to an outer face of said one of the side walls via a pivot portion, a hook extending from the base adjacent one mounting slot, and an elastic arm extending from the base and resisting against the chassis to urge the hook covering one portion of the corresponding mounting slot at the outer face of said one of the side walls and therefore blocking the corresponding post of the data storage device in the corresponding mounting slot, wherein
the latch member is capable of being operated to rotate about the pivot portion to depress the elastic arm and remove the hook away from the mounting slot to thereby release the post.

20. The computer enclosure as claimed in claim 19, wherein each of the mounting slots comprises a vertical portion and a horizontal portion, and a receiving space is defined between the hook and the base, the receiving space communicating with one portion of the horizontal portion and receiving the corresponding post when the hook blocks the corresponding post.

* * * * *